(12) United States Patent
Chieh

(10) Patent No.: US 7,249,230 B2
(45) Date of Patent: Jul. 24, 2007

(54) QUEUE STRUCTURE WITH VALIDITY VECTOR AND ORDER ARRAY

(75) Inventor: Lim Soon Chieh, Penang (MY)

(73) Assignee: Intel Corporation, Santa Clara, CA (US)

( * ) Notice: Subject to any disclaimer, the term of this patent is extended or adjusted under 35 U.S.C. 154(b) by 356 days.

(21) Appl. No.: 10/874,998

(22) Filed: Jun. 23, 2004

(65) Prior Publication Data

US 2005/0289305 A1 Dec. 29, 2005

(51) Int. Cl.
*G06F 12/00* (2006.01)

(52) U.S. Cl. .................. 711/154; 711/156; 711/158

(58) Field of Classification Search ................ 711/154, 711/156, 158; 710/52
See application file for complete search history.

(56) References Cited

U.S. PATENT DOCUMENTS

| | | | |
|---|---|---|---|
| 6,618,320 B2* | 9/2003 | Hasegawa et al. .......... 365/233 |
| 6,732,242 B2* | 5/2004 | Hill et al. .................... 711/158 |
| 6,785,802 B1* | 8/2004 | Roy .......................... 712/216 |
| 2003/0196035 A1* | 10/2003 | Akkary ....................... 711/108 |

* cited by examiner

*Primary Examiner*—Woo H. Choi
(74) *Attorney, Agent, or Firm*—Buckley, Maschoff & Talwalkar LLC

(57) ABSTRACT

According to some embodiments, a queue structure includes a validity vector and an order array.

12 Claims, 15 Drawing Sheets

INITIALIZED

INITIALIZED

WRITE DATA INTO POSITION[4]

QUEUE STRUCTURE WITH VALIDITY VECTOR AND ORDER ARRAY

BACKGROUND

A processing system may write data into and/or read data from a queue. For example, a processor might store instructions into and remove instructions from a queue. In some cases, the order in which data was written into and/or read from a queue may be important. For example, a processing system need to read the oldest (or newest) data from a queue. In addition, a processing system may need to manage a queue (e.g., by moving data from one location to another and/or updating pointers associated with the queue).

DETAILED DESCRIPTION

Some embodiments described herein are associated with a "processing system." As used herein, the phrase "processing system" may refer to any device that processes data. A processing system may be associated with, for example, an INTEL® Architecture (IA) or IXP processor, a network processor, an Application Specific Integrated Circuit (ASIC) device, and/or an embedded processor.

In addition, some embodiments are associated with a processing "queue." As used herein the term "queue" refers to any structure that may be used to store data. Examples of queues include a First-In, First-Out (FIFO) queue, a Last-In, First-Out (LIFO) stack, an instruction issue or dispatch stack, and a write buffer for a data cache.

Figure 1:
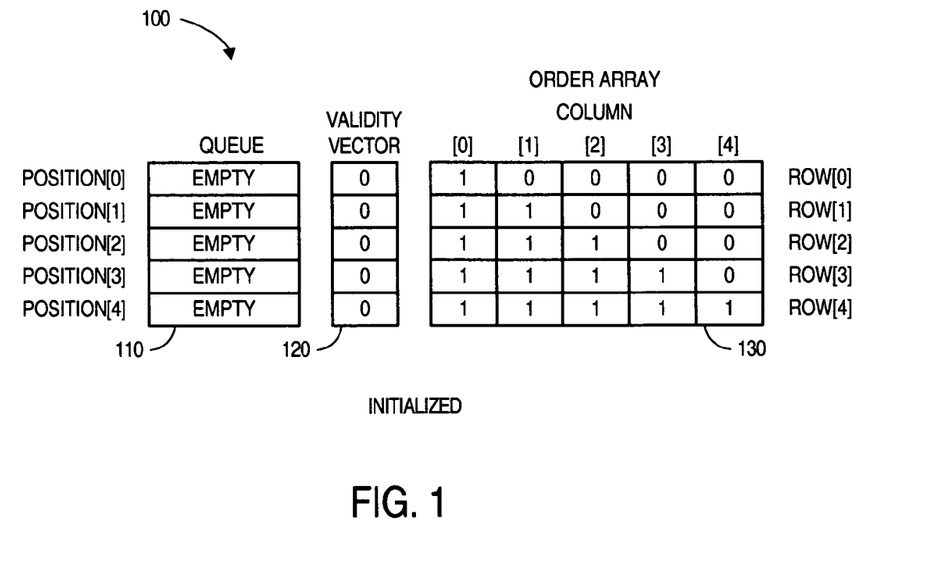
FIG. 1 illustrates a queue structure according to some embodiments.

FIG. 1 illustrates a queue structure 100 according to some embodiments. The structure 100 includes a five-position queue 110 (position[0] through position[4]). That is, n separate portions of data (e.g., each having 32 bits) may be written into and/or read from the queue 110.

The structure 100 also includes an five-bit validity vector 120 (including bit[0] through bit[4]). Each bit in the validity vector indicates whether or not an associated position in the queue 110 contains valid data. By way of example, bit[1] might equal "0" when position[1] does not contain valid data (e.g., is empty) and "1" when the position does contain valid data. The queue structure 100 is empty when all of the bits in the validity vector 120 are "0" and full when all of the bits are "1."

The structure 100 also includes a two-dimensional order array 130. Each row in the order array 130 (row[0] through row[4]) is associated with a position in the queue 110 and each column in the array 130 (column[0] through column [4]) is associated with a position in the queue 110. The order array 130 may be, for example, an five-bit by five-bit array.

Although some embodiments are illustrated herein as having five positions, embodiments may have any number of positions (e.g., a twenty-position queue might have a twenty-bit validity vector and a twenty-bit by twenty-bit order array).

Figure 2:
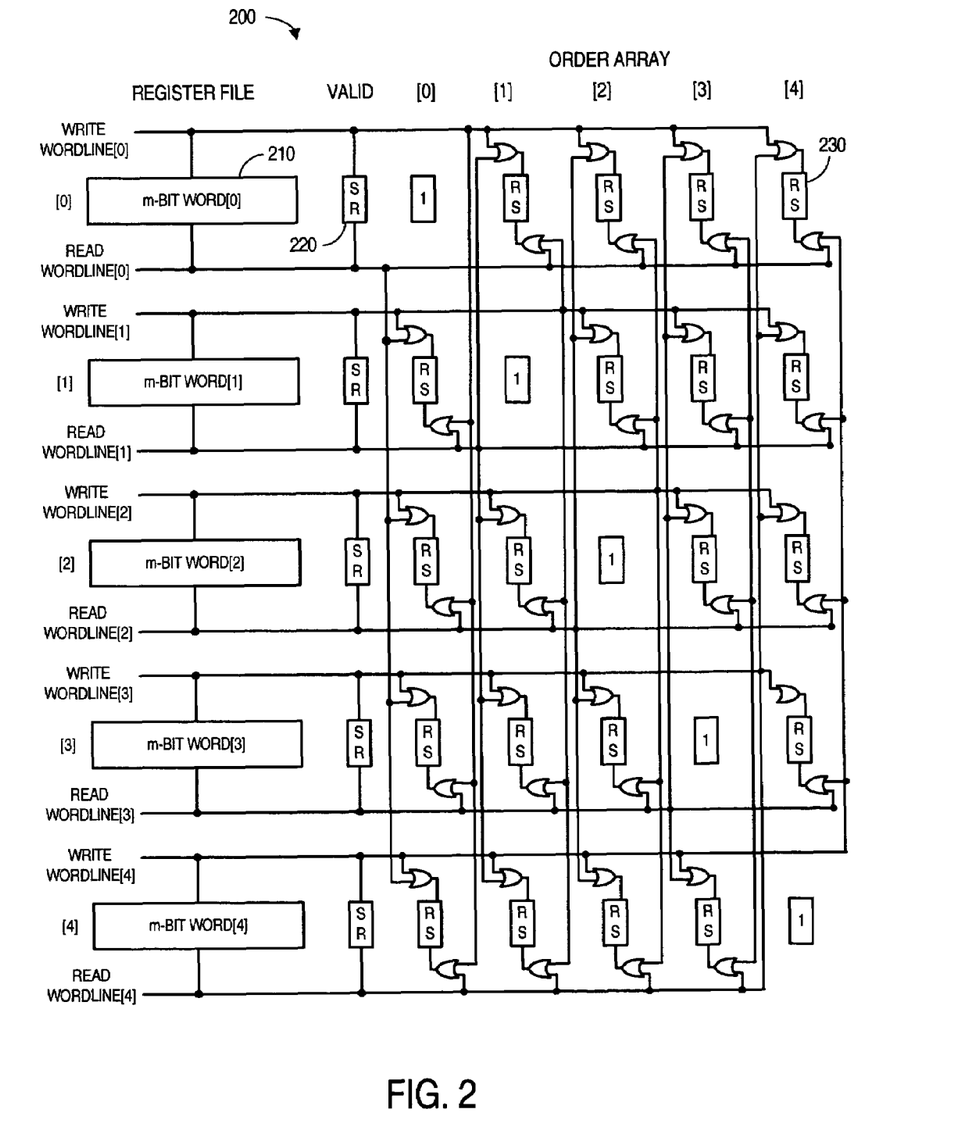
FIG. 2 is a diagram of a queue structure circuit according to some embodiments.

FIG. 2 is a block diagram of a queue structure circuit 200 according to some embodiments. The circuit 200 includes a register file with five m-bit word registers 210 that store data associated with a queue position. Each queue position is also associated with a validity vector latch 220. In addition, an five by five array of order latches 230 is provided. Each row in the array is associated with a queue position and each column in the array is associated with a queue position. For example, the top row and the left-most column in FIG. 2 are associated with position[0].

According to some embodiments, order array latches 230 associated with row[x], column[x], where x is an integer, are always set to "1" (e.g., the five latches 230 associated with row[0], column[0] through row[4], column[4]). According to other embodiments, no latches might be provided for row[x], column[x].

Each queue position has a write wordline that is coupled to the associated register 210 and to a set (S) input of the associated validity vector latch 220. The write wordline[x] associated with position[x] is also coupled to the reset (R) input of every order array latch 230 in row[x] other than then the one in column[x]. Moreover, write wordline[x] is also coupled to the set input of every order array latch 230 in column[x] other than the one in row[x]. Thus, when right wordline[3] is high: (i) the validity vector latch 220 associated with position[3] will be set to "1," (ii) every order array latch 230 in row[3], other than the one in colunm[3], will be reset to "0," and (iii) every order array latch 230 in column[3] will be set to "1."

Each queue position also has a read wordline that is coupled to the associated register 210 and to the reset input of the associated validity vector latch 220. The read wordline[x] associated with position[x] is also coupled to the set input of every order array latch 230 in row[x] other than then the one in column[x]. Moreover, read wordline[x] is also coupled to the reset input of every order array latch 230 in column[x] other than the one in row[x]. Thus, when read wordline[1] is high: (i) the validity vector latch 220 associated with position[1] will be reset to "0," (ii) every order array latch 230 in row[1] will be set to "1," and (iii) every order array latch 230 in column[3] will be reset to "0," other than the one in row[1].

Figure 3:
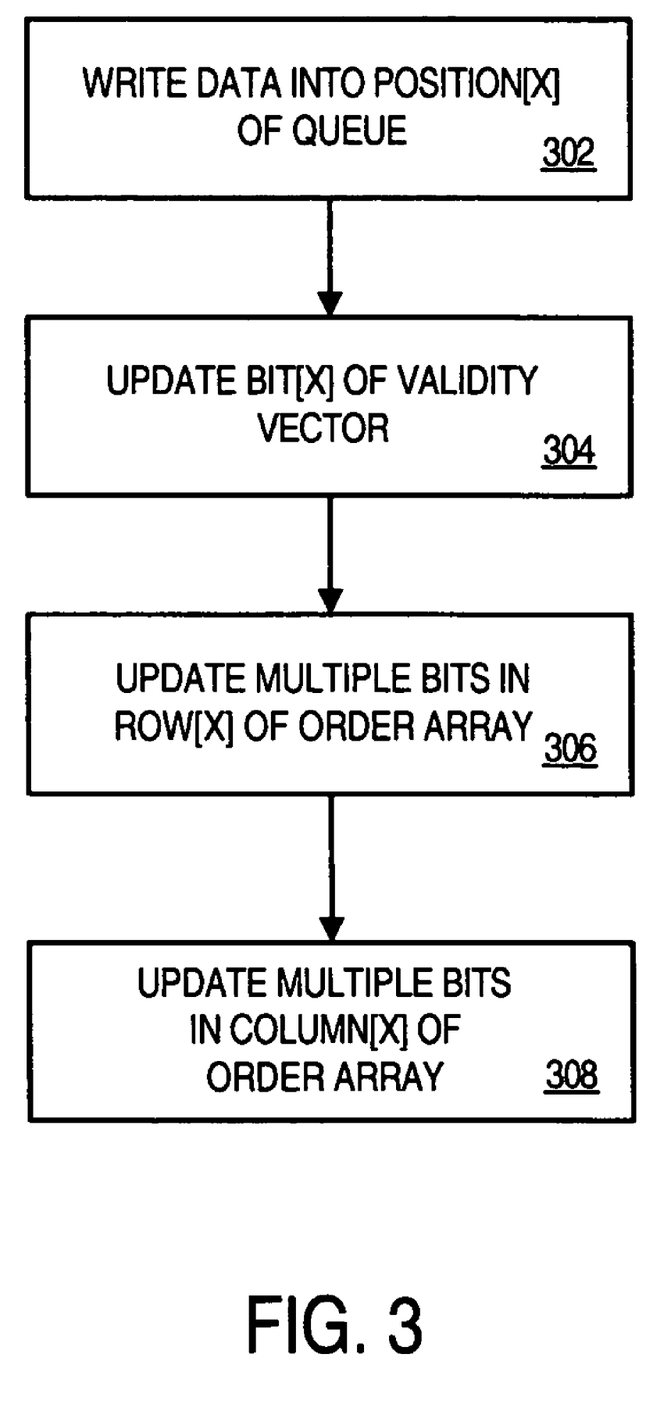
FIG. 3 is a flow chart of a method of writing data into a queue according to some embodiments.

FIG. 3 is a flow chart of a method of writing data into a queue according to some embodiments. The flow charts described herein do not necessarily imply a fixed order to the actions, and embodiments may be performed in any order that is practicable. Note that any of the methods described herein may be performed by hardware, software (including microcode), firmware, or any combination of these approaches. For example, a storage medium may store thereon instructions that when executed by a machine result in performance according to any of the embodiments described herein.

At 302, data is written into position[x] of an n-position queue. Consider, for example, a sixteen-position queue that is able to store thirty two bits of data in each position. In this case, a processing system may determine that thirty two bits of data need to be stored in the queue and then store the data in queue position[11] (e.g., after selecting an appropriate position as described with respect to FIGS. 8 and 9).

At 304, bit[x] of an n-bit validity vector is updated to indicate that position[x] contains valid data. When data has been stored in queue position[11], for example, validity vector bit[11] might be set to "1."

At 306, multiple bits in row[x] of a two-dimensional order array are updated. For example, multiple bits in row[x] of an order array might be updated as described with respect to FIGS. 4 through 7. Similarly, multiple bits in column[x] of the order array are updated at 308.

Referring again to FIG. 1, the five-bit by five-bit order array 130 has been initialized with the illustrated data. This might be performed, for example, when a processing system begins to execute instructions, an application is started, and/or the queue structure 100 has been reset. In particular, every bit in the validity vector 120 has been initialized to "0." Moreover, every row[x] in the order array 130 has been initialized such that any bit in a column before column[x] is set to "1" and any bit in a column after column[x] is set to "0." By way of example, row[2] of the order array 130 has been initialized to "11100."

FIGS. 4 through 7 illustrate data being written into this queue structure 100 according to some embodiments. In particular, in FIG. 4 a first data entry has been written into position[3] of the queue 110. As a result, the validity vector bit associated with that position (e.g., bit[3]) has been changed from "0" to "1" to indicate that the position now contains valid data.

Figure 4:
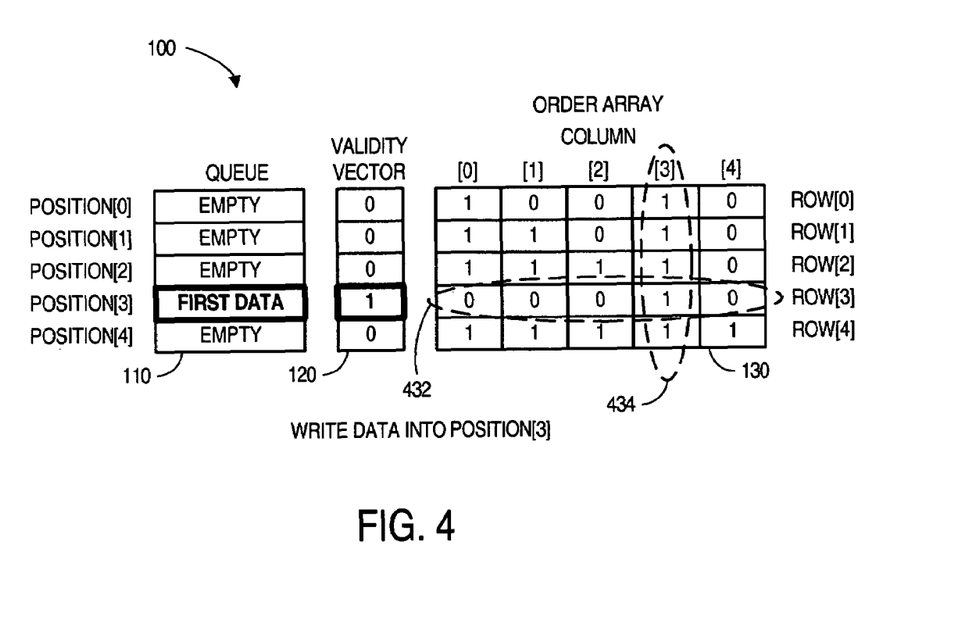
FIGS. 4 through 7 illustrate data being written into a queue structure according to some embodiments.

In addition, every bit the row of the order array 130 associated with that position (e.g., as illustrated by dashed line 432) has been reset to "0" with the exception of the bit in the column associated with that position (i.e., in row[3], column[3]. Moreover, every bit in the column of the order array 130 associated with that position (e.g., as illustrated by dashed line 434) has been set to "1." Note that in the circuit 200 described with respect to FIG. 2, these updates to the validity vector 120 and the order array 130 might be accomplished by setting right wordline [3] to high.

Figure 5:
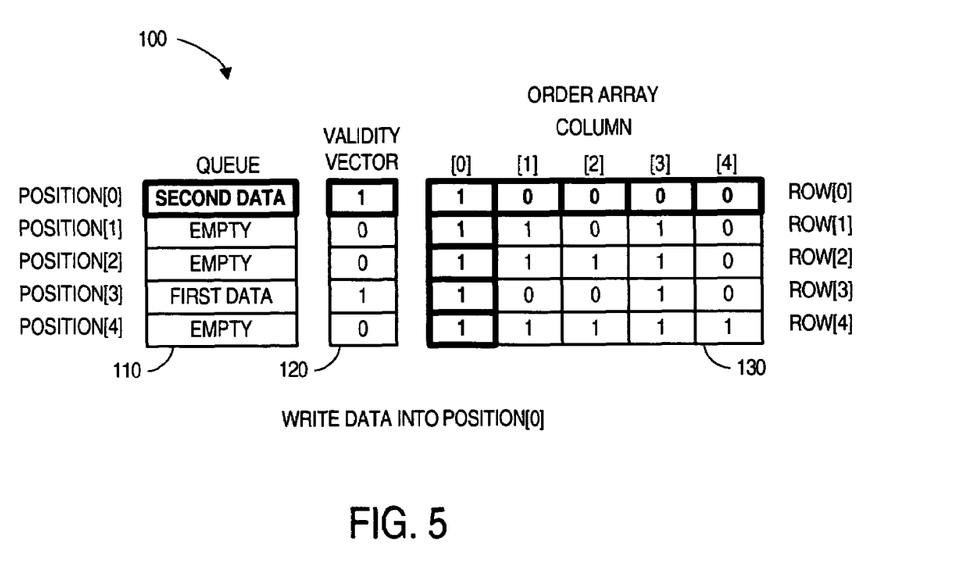
Figure 6:
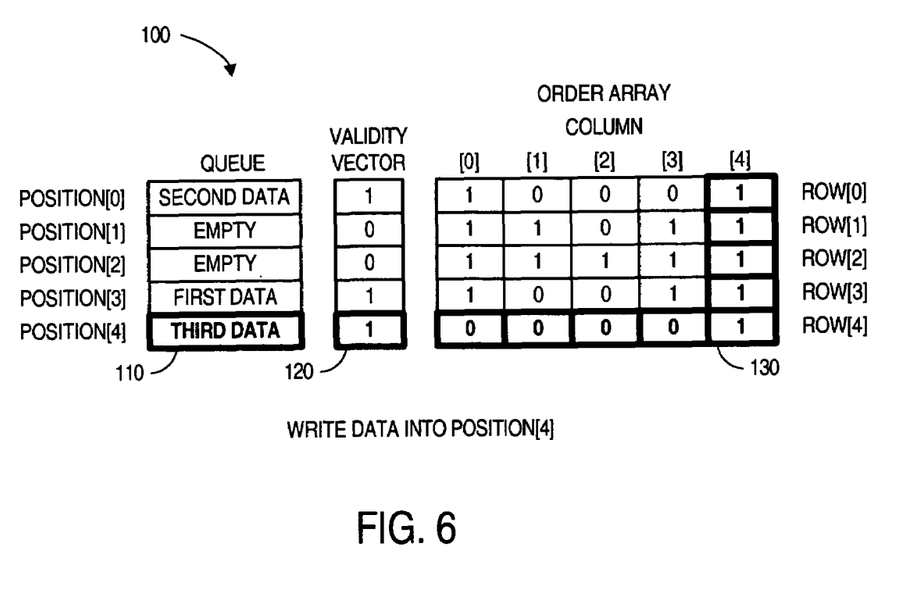
Figure 7:
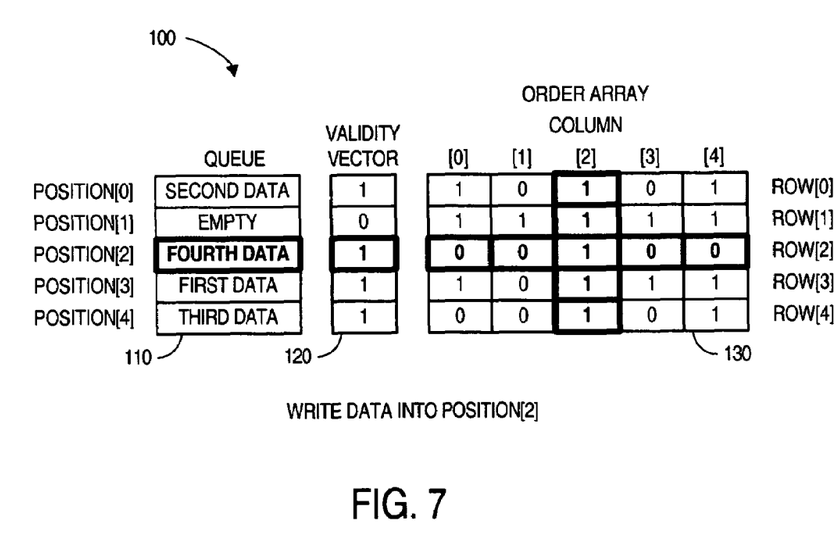

In FIG. 5, a second data entry has been written into position[0] of the queue 110. As before, validity vector bit[0] has been set to "1," every bit in row[0] has been reset to "0" with the exception of the bit in column[0], and every bit in column[0] has been set to "1." A third data entry has been written into position[4] in FIG. 6, and as a result, validity vector bit[4] has been set to "1," every bit in row[4] has been reset to "0" with the exception of the bit in column[4], and every bit in column[4] has been set to "1." In FIG. 7, a fourth data entry has been written into position[2], validity vector bit[2] has been set to "1," every bit in row[2] has been reset to "0" with the exception of the bit in column[2], and every bit in column[2] has been set to "1."

Note that the information in the validity vector 120 and order array 130 may be used to determine the order in which the data was written into the queue. For example, there will be fewer "1s" in a row of the order array 130 associated with an newer entry in the queue structure 100 as compared to an older entry. In the example described with respect to FIGS. 4 through 7, the first data that was written has four "1s" in row[3], the second data that was written has three "1s" in row[0], the third data that was written has two "1s" in row[4], and the fourth and last data that was written has a single "1" in row[2]. Similarly, there are more "1s" in a column of the order array 130 associated with a newer entry in the queue structure 100 as compared to an older entry. Thus, information in the validity vector 120 and the order array 130 may be used to determine the order in which data was stored into the queue structure 100.

In some cases, a processing system may need to determine the oldest entry in a queue, referred to as the "head" position of the queue. For example, in FIFO queue the head position might be used to determine which entry should next be removed from the queue.

According to some embodiments, a head position of a queue is determined based on information in a validity vector and an order array. For example, the following technique might be used to determine the head position of an N-position queue:

```
For each n, where n = 0 to N // rows
    For each m, where m = 0 to N // columns
        A[n][m] = valid[n] AND order[n][m]
    End loop
End loop
For each k, where k = 0 to N // columns
    head[k] = 0
    For each j, where j = 0 to N // rows
        If (k does not equal j)
            head[k] = head[k] OR A[j][k]
    End loop
    head[k] = NOT(head[k])
End loop
```

In this case, the first portion of the technique creates an array A that represents the order array with any row reset to all "0s" when the corresponding entry in the validity vector (valid[n]) indicates that the associated position does not currently contain valid data. The second portion of the technique then sets head[x] to "1" only when every bit in column[x], other than the bit associated with row[x], is equal to "0." In the example illustrated in FIG. 7, head[3] would equal "1" (and every other head[x] would equal "0"). That is, position[3] is the oldest entry in and the head position of the queue structure 100.

Figure 8:
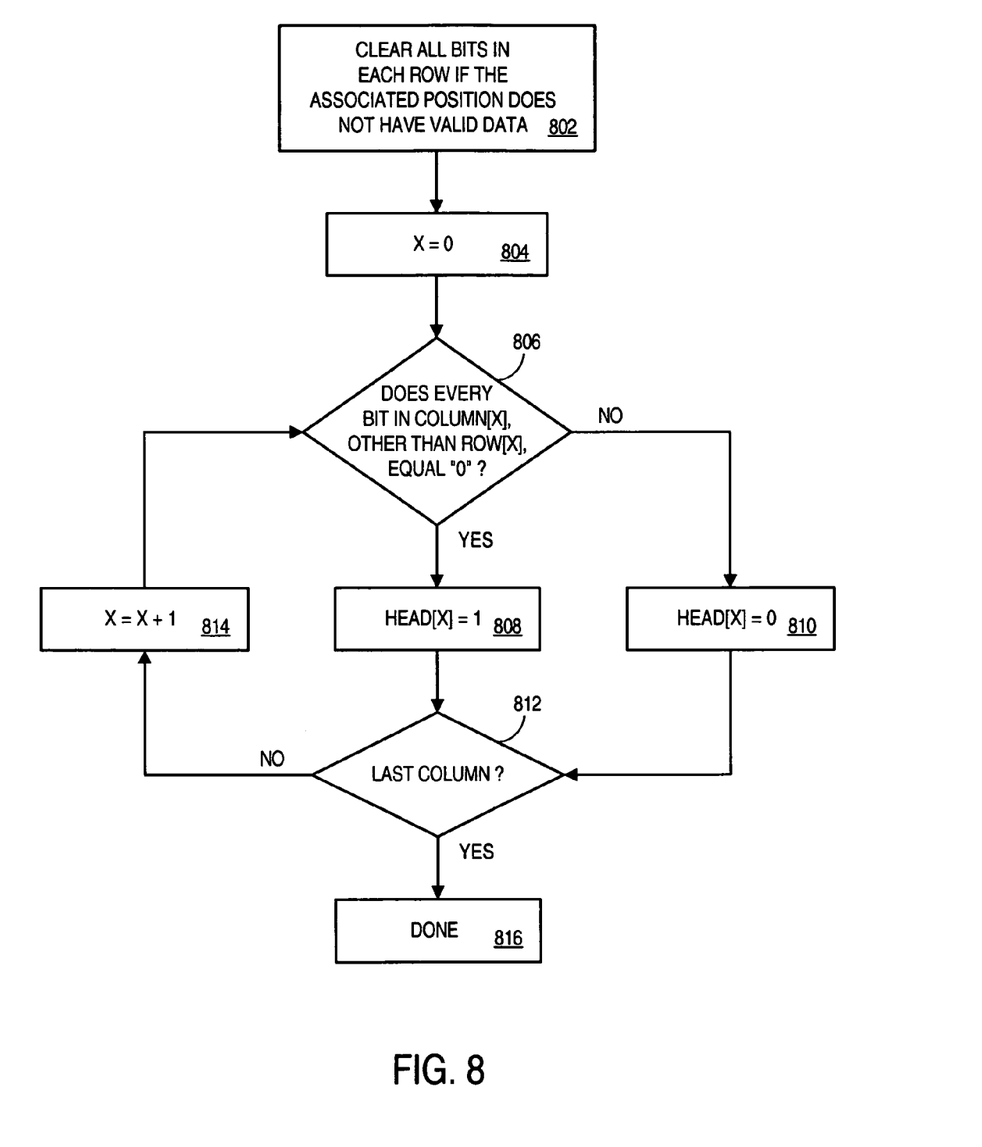
FIG. 8 is a flow chart of a method of determining a head position of a queue according to some embodiments.

FIG. 8 is a flow chart of a method of determining a head position of a queue according to some embodiments. At 802, the bits in each row of an order array (or a copy of the order array) are cleared if the associated position does not contain valid data.

At 804, x (representing a column in an order array) is initialized to "0." If every bit in column[x], other than row[x], is equal to "0" at 806, head[x] is set to "1" at 808. If at least one bit in column[x], other than row[x], is equal to "1," then head[x] is set to "0" at 810. If the last column in the order array has been evaluated at 812, the method is done at 816. Otherwise, x is incremented at 814 and the process continues. After all columns have been evaluated, the column having a head[x] value of "1" is the head position of the queue.

Figure 9:
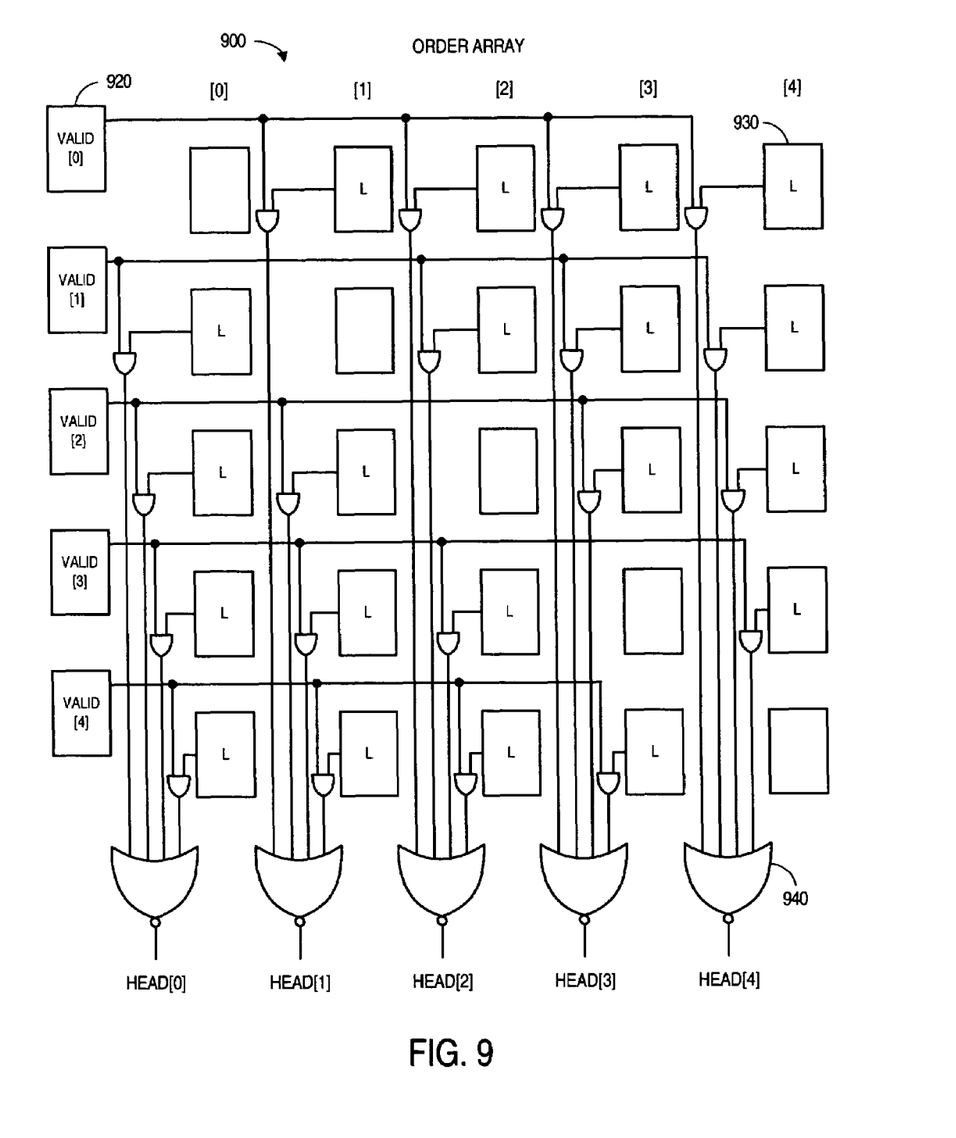
FIG. 9 is a diagram of a head position determination circuit according to some embodiments.

FIG. 9 is a diagram of a head position determination circuit 900 for a five-position queue according to some embodiments. The circuit 900 includes five validity vector latches 920 and a five by five array of order latches 930. The bits from each order array latch 930 in a column[x] is provided to an AND gate along with the bit from the associated validity vector latch 920 and the output of the AND gates are provided to a NOR gate 940. The output of the NOR gate 940 for column[x] represents head[x]. That is, head[x] will be set to "1" only if all of the valid bits in column[x] (other than the bit in row[x]) are equal to "0." Note that the determination of the head position might not be in a timing critical path (e.g., extra processing cycles might not be required to make the determination).

Figure 10:
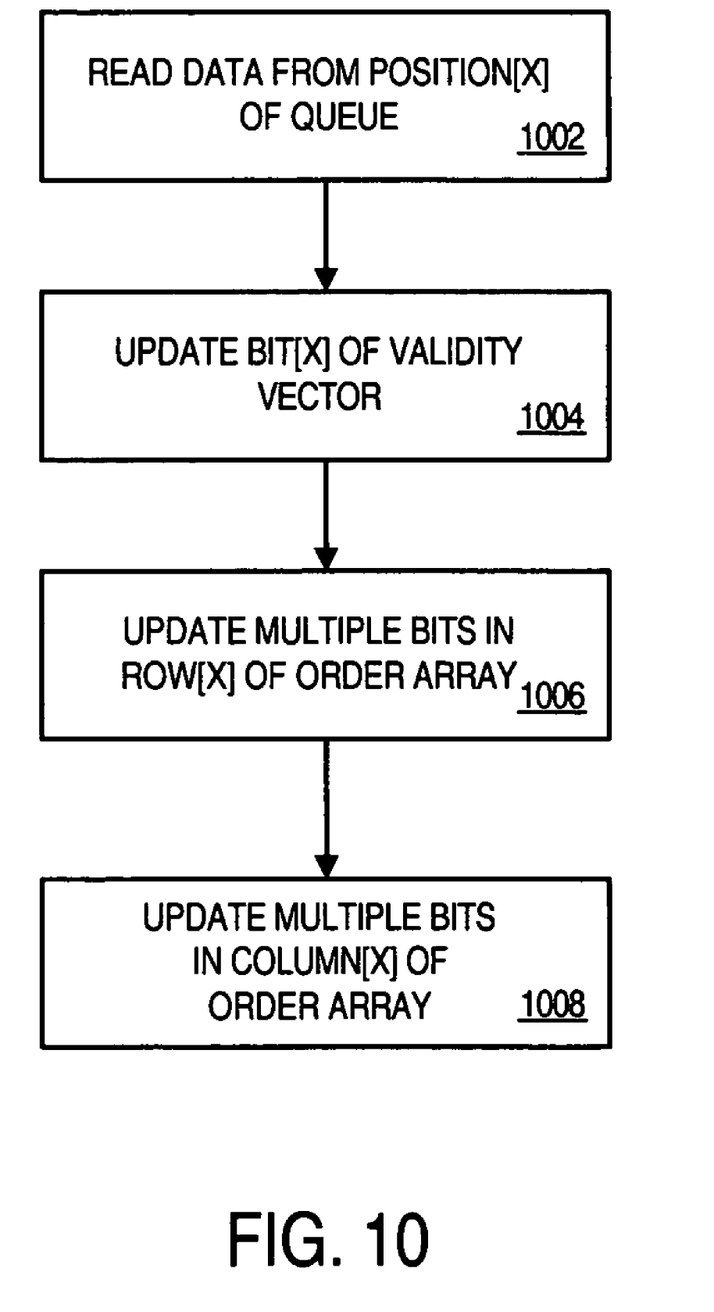
FIG. 10 is a flow chart of a method of reading data from a queue according to some embodiments.

In addition to writing data into a queue, a processing system may need to read data from the queue. FIG. 10 is a flow chart of a method of reading data from a queue according to some embodiments. At 1002, data is read from position[x] of the queue and bit[x] of the validity vector is updated at 1004 to indicate that position[x] no longer contains valid data (e.g., the entry has been removed from the queue). For example, when data is read from the queue position[2], bit[2] of the validity vector might be reset to "0."

At 1006, multiple bits in row[x] of a two-dimensional order array are updated. For example, multiple bits in row[x] might be updated as described with respect to FIGS. 11 and 12. Similarly, multiple bits in column[x] of the order array are updated at 1108.

Figure 11:
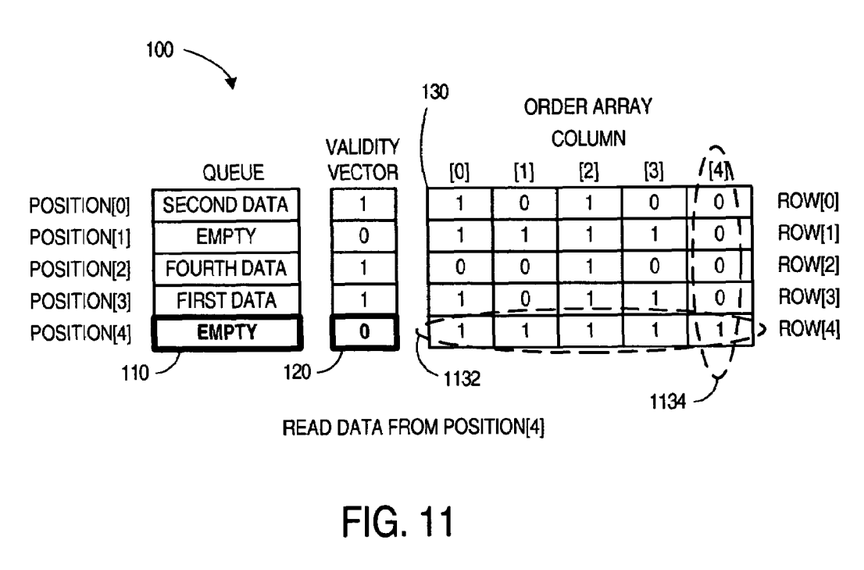
FIGS. 11 and 12 illustrate data being read from a queue structure according to some embodiments.
Figure 12:
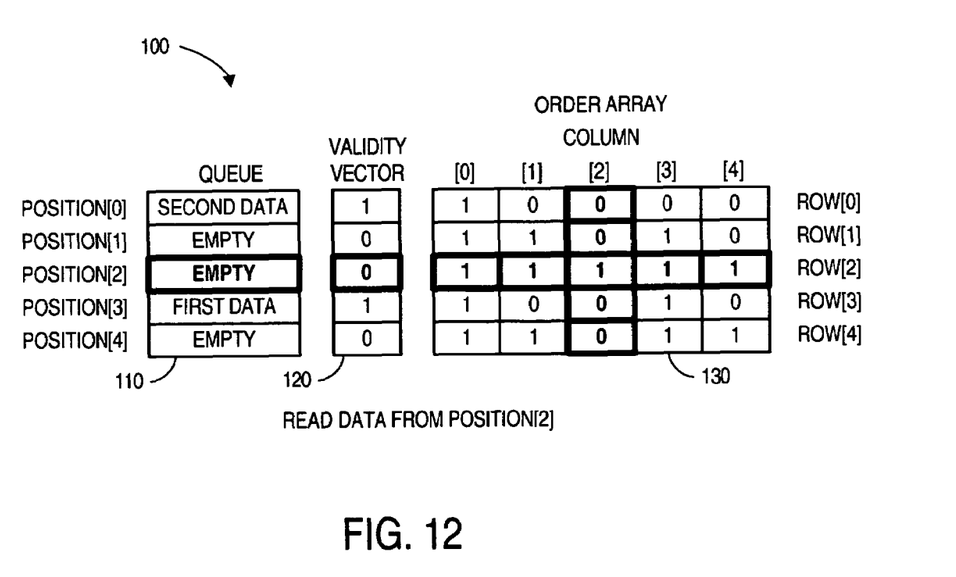

FIGS. 11 and 12 illustrate data being read from the queue structure 100 according to some embodiments. In particular, in FIG. 11 a data entry has been read from position[4] of the queue 110. As a result, the validity vector bit associated with that position (e.g., bit[4]) has been changed from "11" to "0" to indicate that position[4] no longer contains valid data.

In addition, every bit in the row of the order array 130 associated with that position (e.g., as illustrated by dashed line 1132) has been set to "1." Moreover, every bit in the column of the order array 130 associated with that position (e.g., as illustrated by dashed line 1134) has been set to "0" with the exception of the bit in the row associated with that position (i.e., row[4], column[4] of the order array 130). Note that in the circuit 200 described with respect to FIG. 2, these updates to the validity vector 120 and the order array 130 might be accomplished by setting read wordline [4] to high.

In FIG. 12, another data entry has been read from position [2] of the queue 110. As before, validity vector bit[2] has been set to "0," every bit in row[2] has been set to "1," and every bit in column[2] has been reset to "0" with the exception of the bit in row[2].

In some cases, a processing system may need to determine the last position in a queue from which data was read, referred to as the "tail" position of the queue. For example, the processing system might write data into the tail position (e.g., the most recently freed entry of the queue).

According to some embodiments, a tail position of a queue is determined based on information in a validity vector and an order array. For example, the following technique might be used to determine the tail position of an N-position queue:

```
For each n, where n = 0 to N // rows
    tail[n] = 0
    For each m, where m = 0 to N // columns
        tail[n] = tail[n] AND order[n][m]
    End loop
    tail[n] = tail[n] AND (NOT valid[n])
End loop
```

In this case, the technique sets tail[n] to "1" only if (i) the associated bit in the validity vector is "0" and (ii) every bit in row[n] of the order array is equal to "1." In the example illustrated in FIG. 12, tail[2] would equal "1" (and every other tail[x] would equal "0"). That is, position[2] is the last position from which data was read and the tail position of the queue 110.

Note that the particular methods described herein are for illustration only, and other techniques might be used to determine a head or tail position. For example, the following is another technique that might be used to determine a tail position:

```
For each k, where k = 0 to N // columns
    tail[k] = 0
    For each j, where m = j to N // rows
        if (k does not equal j)
            tail[k] = tail[k] OR order[j][k]
    End loop
    tail[n] = NOT(tail[k]) AND (NOT valid[k])
End loop
```

Figure 13:
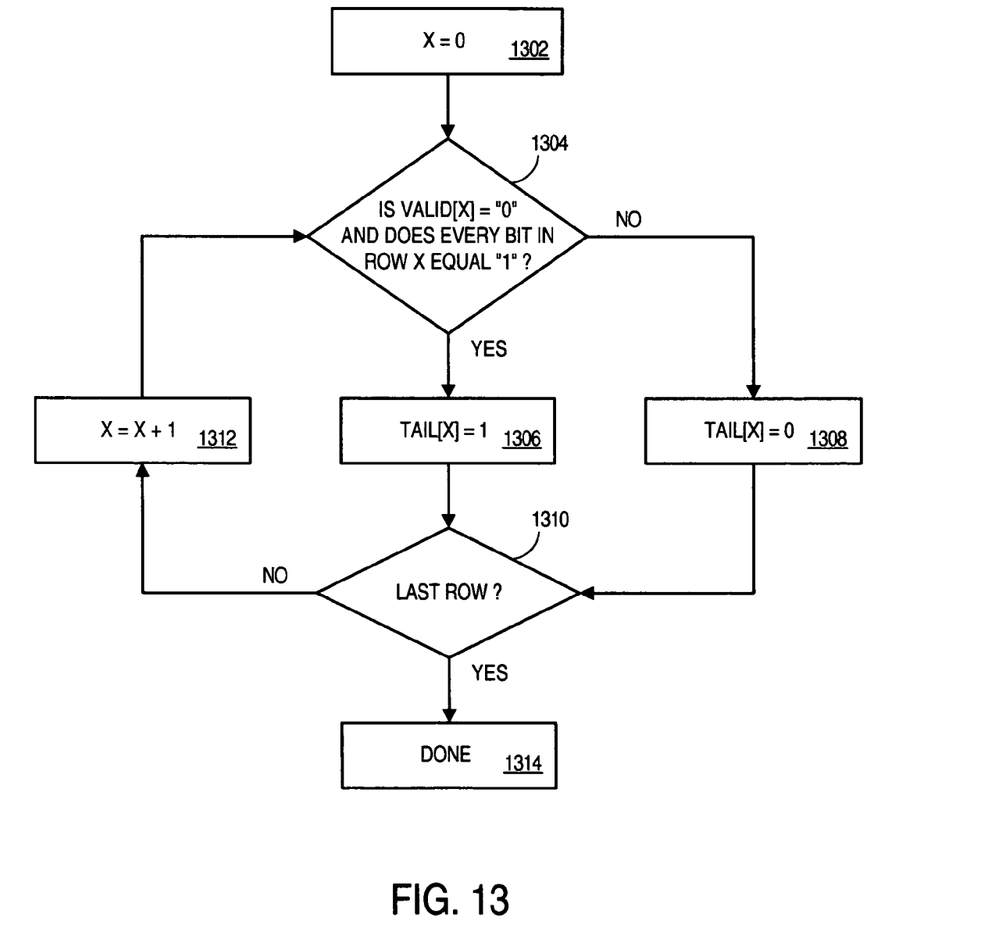
FIG. 13 is a flow chart of a method of determining a tail position of a queue according to some embodiments.

FIG. 13 is a flow chart of a method of determining a tail position of a queue according to some embodiments. At 1302, x (representing a row in an order array) is initialized to "0." If the associated validity vector bit[x] equals "0" (meaning that position[x] does not currently contain valid data) and every bit in row[x] is equal to "1" at 806, then tail[x] is set to "1" at 1306. If validity vector bit[x] equals "1" or any bit in row[x] equals "0" then tail[x] is set to "0" at 1308.

When the last row in the order array has been evaluated at 1310, the method is done at 1314. Otherwise, x is incremented at 1312 and the process continues. After all rows have been evaluated, the column having a tail[x] value of "1" is the tail position of the queue.

Figure 14:
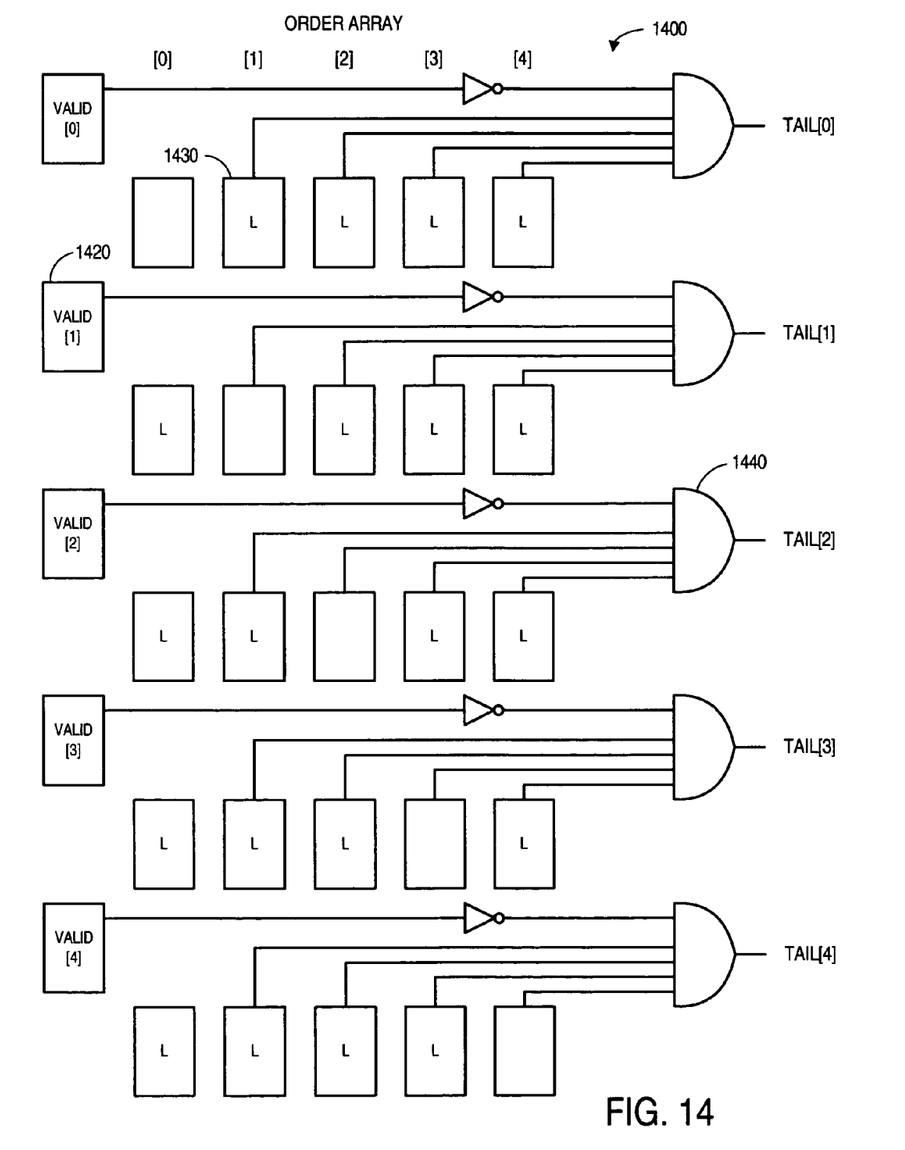
FIG. 14 is a diagram of a tail position determination circuit according to some embodiments.

FIG. 14 is a diagram of a tail position determination circuit 1400 for a five-position queue according to some embodiments. The circuit 1400 includes five validity vector latches 1420 and a five by five array of order latches 1430. The bits from every order array latch 1430 in a row[x] (other than the one from column[x]) are provided to an AND gate 1440 along with an inverted bit from the associated validity vector latch 1420. The output of the AND gate 1440 for row[x] represents tail[x]. That is, tail[x] will be set to "1" only for the row from which data was most recently read. Note that the determination of the tail position might not be in a timing critical path (e.g., extra processing cycles might not be required to make the determination).

Thus, embodiments may provide a queue that is associated with a validity vector and/or a two-dimensional order array. In the case of sequential reads, information in the validity vector and order array may be used to determine a head position (e.g., the entry that is most likely to be read next). In the case of sequential writes, information in the validity vector and order array may be used to determine a tail position (e.g., the entry where new data should be written).

The queue may also support random or out-of-order writes and/or reads, and order information may be determined using the validity vector and order array as described herein. For example, pre-fetched instructions may be efficiently placed into and removed from an instruction issue or dispatch stack in an out-of order fashion.

In addition, when data is read from a queue position (e.g., a word is retired or discarded from the queue), the freed entry may be ready to accept new data without moving or destroying the existing information in the queue structure or re-allocating the other entries in the queue. For example, a freed entry between two occupied entries may not be wasted (e.g., the queue is inherently compressible and compact). As a result, information may be kept in a queue for longer periods of time (e.g., improving write coalescence for a write buffer).

Figure 15:
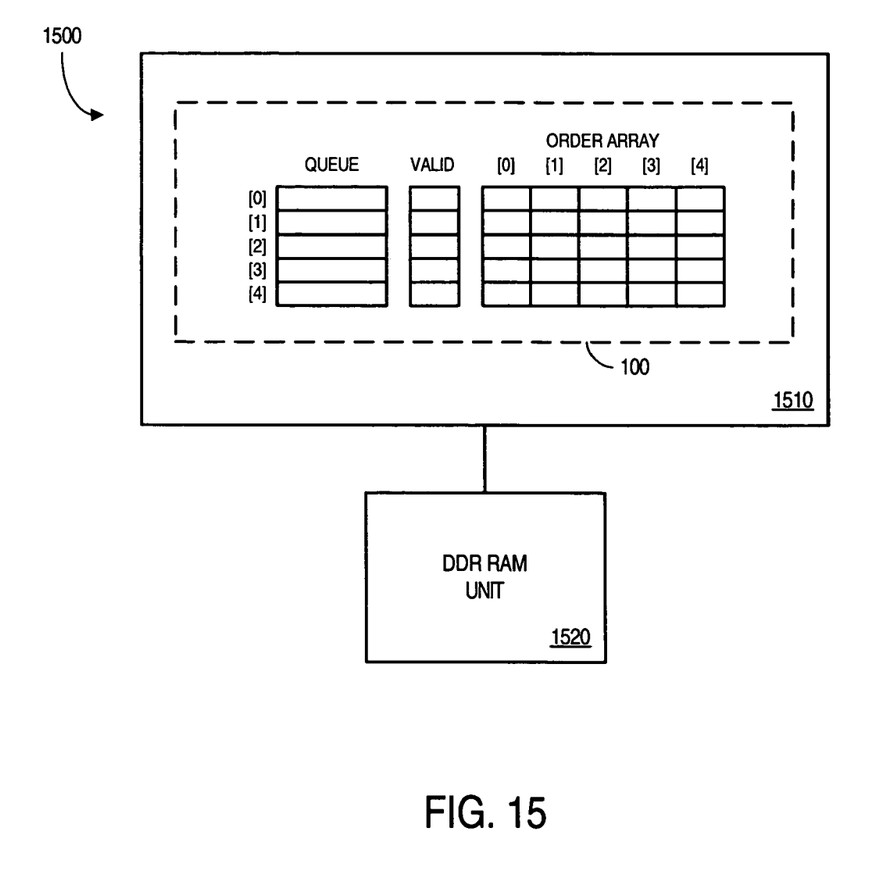
FIG. 15 is a block diagram of a system according to some embodiments.

FIG. 15 is a block diagram of a system 1500, such as a Personal Computer (PC), a server, or a mobile device. The system 1500 includes a processor 1510, such as a microprocessor, a network processor, and ASIC device, or an embedded processor. The processor 1510 incorporates a queue structure 100 in accordance with any of the embodiments described herein. For example, the queue structure 100 might include a validity vector and/or an order array.

The processor 1510 may exchange information with a memory unit, such as a Double Data Rate (DDR) Random Access Memory (RAM) unit 1520. For example, the processor 1510 may retrieve instructions from the DDR RAM unit 1520.

The following illustrates various additional embodiments. These do not constitute a definition of all possible embodiments, and those skilled in the art will understand that many other embodiments are possible. Further, although the following embodiments are briefly described for clarity, those skilled in the art will understand how to make any changes, if necessary, to the above description to accommodate these and other embodiments and applications.

Note that in some embodiments, row[x], column[x] of the order array does not contain any information (e.g., those bits are always set to "1"). Embodiments may instead set those bits to "0" or not implement those bits at all. Moreover, although examples have used "1" to indicate that a position contains valid data, embodiments could instead use "0" (e.g., and the methods and circuits described herein may be adjusted accordingly). Similarly, the meanings of "0" and "1" in the order array may be reversed.

The several embodiments described herein are solely for the purpose of illustration. Persons skilled in the art will recognize from this description other embodiments may be practiced with modifications and alterations limited only by the claims.

What is claimed is:

1. A method, comprising:
   initializing each bit in an n-bit validity vector to "0";
   initializing each row[x] of an n-position queue, where x is an integer, such that any bit in a column of a two-dimensional order array before column[x] is set to "1" and any bit in a colunm after column[x] is set to "0";
   writing data into position[x];
   updating bit[x] of the n-bit validity vector to indicate that position[x] contains valid data;
   updating multiple bits in row[x] of the two-dimensional order array; and
   updating multiple bits in column[x] of the order arrays, wherein the order array is an n-bit by n-bit array.

2. The method of claim 1, wherein said updating multiple bits in row[x] comprises:
   setting bits in all columns of row[x], other than column [x], to "0."

3. The method of claim 2, wherein said updating multiple bits in column[x] comprises:
   setting bits in all rows of column[x] to "1."

4. The method of claim 3, further comprising:
   determining an order of queue positions based on the validity vector and the number of "1s" in the row associated with each position in the order array.

5. The method of claim 3, further comprising:
   determining a head position of the queue based on the validity vector and information in the order array.

6. The method of claim 1, further comprising:
   reading data from position[x] of the queue;
   updating bit[x] of the validity vector to indicate that position[x] does not contain valid data;
   updating multiple bits in row[x] of the order array; and
   updating multiple bits in column[x] of the order array.

7. The method of claim 6, wherein said updating multiple bits in row[x] comprises:
   setting bits in all columns of row[x] to "1."

8. The method of claim 7, wherein said updating multiple bits in coluinn[x] comprises:
   setting bits in all rows of column[x], other than row[x], to "0."

9. The method of claim 6, further comprising:
   determining a tail position of the queue based on the validity vector and information in the order array.

10. An article, comprising:
    a storage medium having stored thereon instructions that when executed by a machine result in the following:
    initializing each bit in an n-bit validity vector to "0";
    initializing each row[x] of an n-position queue, where x is an integer, such that any bit in a column of a two-dimensional order array before column[x] is set to "1" and any bit in a column after column[x] is set to "0";
    writing data into position[x];
    updating bit[x] of the n-bit validity vector to indicate that position[x] contains valid data;
    updating multiple bits in row[x] of the two-dimensional order array; and
    updating multiple bits in column[x] of the order array, wherein the order array is an n-bit by n-bit array.

11. The article of claim 10, further comprising:
    reading data from position[x] of the queue;
    updating bit[x] of the validity vector to indicate that position[x] does not contain valid data;
    updating multiple bits in row[x] of the order array; and
    updating multiple bits in column[x] of the order array.

12. A method, comprising:
    initializing each bit in an n-bit validity vector to a first value;
    initializing each row[x] of an n-position queue, where x is an integer, such that any bit in a column of a two-dimensional order array before column[x] is set to a second value and any bit in a column after column[x] is set to the first value;
    writing data into position[x];
    updating bit[x] of the n-bit validity vector to indicate that position[x] contains valid data;
    updating multiple bits in row[x] of the two-dimensional order array; and
    updating multiple bits in column[x] of the order array, wherein the order array is an n-bit by n-bit array.

* * * * *